United States Patent [19]
Ekeroth

[11] Patent Number: 5,305,357
[45] Date of Patent: Apr. 19, 1994

[54] LOW ACTIVATED INCORE INSTRUMENT

[75] Inventor: Douglas E. Ekeroth, Delmont, Pa.

[73] Assignee: Westinghouse Electric Corp., Pittsburgh, Pa.

[21] Appl. No.: 52,843

[22] Filed: Apr. 28, 1993

Related U.S. Application Data

[63] Continuation of Ser. No. 903,631, Jun. 24, 1992, abandoned.

[51] Int. Cl.$^5$ .............................................. G21C 17/00
[52] U.S. Cl. ................................................ 376/254
[58] Field of Search ............... 376/254, 255, 245, 347, 376/463

[56] References Cited

U.S. PATENT DOCUMENTS

| | | | |
|---|---|---|---|
| 3,827,935 | 8/1974 | Gruner et al. | 376/245 |
| 3,892,969 | 7/1975 | Warren | 376/254 |
| 3,899,390 | 8/1975 | Klein et al. | 376/245 |
| 3,976,541 | 8/1976 | Stiteler et al. | 376/245 |
| 4,325,786 | 4/1982 | Wohlsen | 376/442 |
| 4,438,649 | 3/1984 | Gilman | 376/245 |
| 4,751,039 | 6/1988 | Delevallee et al. | 376/254 |
| 4,765,947 | 8/1988 | Babin et al. | 376/245 |
| 4,917,853 | 4/1990 | Feurgard | 376/255 |
| 4,983,351 | 1/1991 | Tower et al. | 376/254 |
| 5,078,957 | 1/1992 | Tower et al. | 376/254 |
| 5,120,491 | 6/1992 | Brown et al. | 376/254 |

FOREIGN PATENT DOCUMENTS

| | | |
|---|---|---|
| 0084171 | 7/1983 | European Pat. Off. . |
| 0938594 | 10/1963 | United Kingdom . |
| 1517497 | 7/1978 | United Kingdom . |

OTHER PUBLICATIONS

Lamarsh, *Introduction to Nuclear Engineering*, Addison-Wesley Publishing Co., Dec. 1977, pp. 42–46, 592–595.

Primary Examiner—Daniel D. Wasil
Attorney, Agent, or Firm—J. C. Valentine

[57] ABSTRACT

Instrumentation for nuclear reactor head-mounted incore instrumentation systems fabricated of low nuclear cross section materials (i.e., zirconium or titanium). The instrumentation emits less radiation than that fabricated of conventional materials.

8 Claims, 6 Drawing Sheets

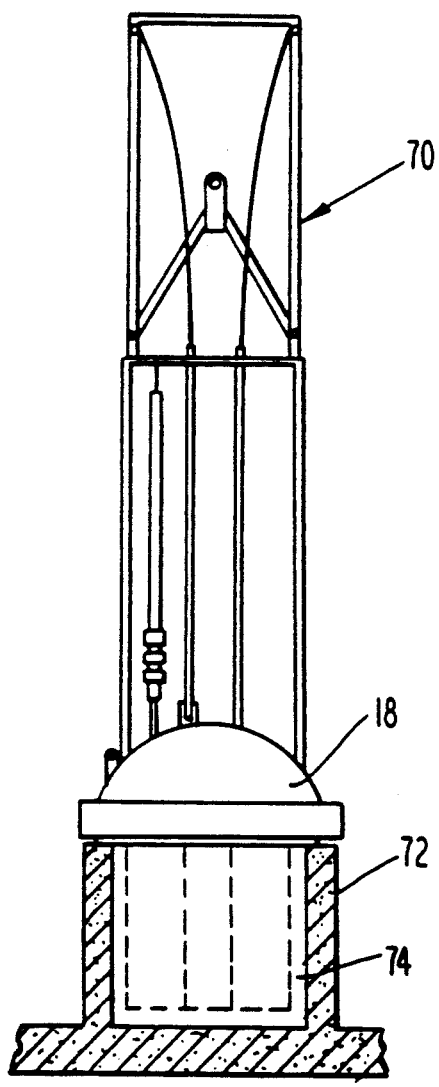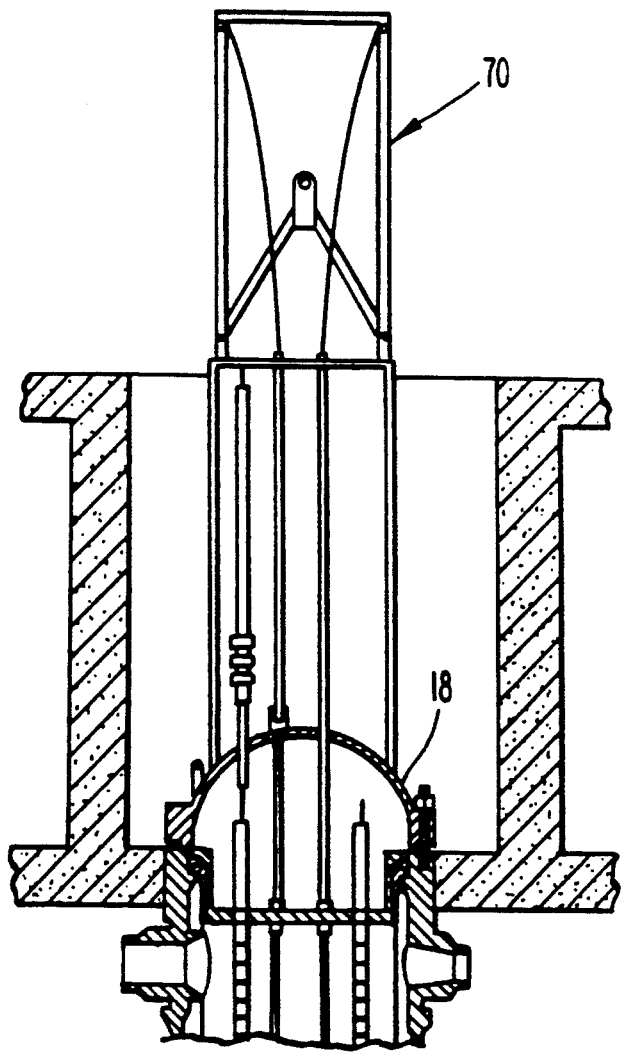
FIG. 4A
FIG. 4B

LOW ACTIVATED INCORE INSTRUMENT

GOVERNMENT CONTRACT

The Government of the United States of America has rights in this invention pursuant to Contract No. DE-ACO3-90SF18495 awarded by the Department of Energy.

This application is a continuation of application Ser. No. 07/903,631 filed Jun. 24, 1991, now abandoned.

BACKGROUND OF THE INVENTION

1. Field of the Invention

The present invention relates to pressurized nuclear reactors, (PWRs), particularly to nuclear reactor components, and more particularly to head-mounted, removable incore instrumentation, such as thimble sheath, mandrel, and lead wires as used in advanced light water reactors such as the Westinghouse AP600.

2. Brief Description of the Prior Art

Current projections indicate that electrical energy demands will continue to grow, so that by the year 2010, there will be a need for approximately 117,000 to 322,000 MWe of new generating capacity in the United States. Although the growth in electricity demand continues to be strong, orders for new nuclear power plants have not kept pace, in part as a result of licensing delays, prohibitive construction costs, and public concerns relating to the safety of nuclear power. Nonetheless, increased awareness of the environmental and economic security risks attendant an excessive dependence on fossil fuels has led to a growing realization that nuclear power must play a major role in the world's energy future.

Of key importance in maintaining nuclear power as an attractive energy option for the future is the need to improve upon the safety, simplicity, reliability, and cost of construction and operation of nuclear reactors. This goal is being sought by the development of a new generation nuclear reactor, the Westinghouse AP600, which is part of a greatly simplified nuclear power plant, in terms of number of systems and equipment, operation inspections, maintenance, and quality assurance requirements relative to prior nuclear reactors.

As an example of simplified safety systems, the AP600 has replaced many of the active, powered safety systems of prior reactors with systems known as "passive," because they rely on natural forces such as gravity, convection, and evaporation, rather than operator action.

Part of the simplification of the AP600 reactor is the development of an integrated head package (IHP) that combines several separate components in one structure to simplify refueling the reactor. The goal of the integrated head package is to reduce outage time and personnel radiation exposure by combining operations associated with this movement into a single structure. This integrated head package connects to the reactor vessel head, controlled rod drive mechanism, seismic supports, cables, messenger tray, and cable bridge. Furthermore, the incore instrumentation system (IIS) is mounted above the reactor head and integral with the integrated head package, and is, therefore, moved with the integrated head package. The incore instrumentation system includes core thermocouples which are generally housed in instrument columns sealed using conoseals. These conoseals have caused increased outage durations due to leakage during plant start-up. The AP600 has replaced these conoseals with smaller, simpler tube fittings, (SwageLock TM) which are used in plants with bottom-mounted instrumentation.

When the reactor is operating, measurements of neutron flux must be carried out inside the reactor core in various places distributed along its cross section and along its height. These measurements are carried out by the incore nuclear instrumentation, which comprises the subject matter of the present invention. Previously, incore instrumentation was mounted on the bottom of the reactor vessel. Currently, however, there has been an emergence of DOE, EPRI, and NRC preference for incore instrumentation systems which do not penetrate the reactor vessel below the core, and which employ fixed incore detectors. Accordingly, incore instrumentation systems, such as fixed incore detection thimbles, are now being mounted on the reactor head, and inserted through the closure head and into the core of the PWR, as disclosed in U.S. Pat. No. 5,078,957, incorporated by reference herein.

A serious drawback to mounting the incore instrumentation system above the reactor head and integral with the integrated head package, however, is that this instrumentation, which previously was mounted at the bottom of the reactor vessel, may cause high levels of radiation exposure to workers who venture too close to the head-mounted instrumentation, especially during refueling, when the reactor head becomes an area of high activity.

The transport of the reactor vessel head containing 16 to 38 thimbles which have been irradiated in the core for 1½ years requires the use of special procedures and possibly special shielding, especially when the head is lifted above the floor and appreciable gamma shine and scatter are present in containment. Removing all personnel from containment or locating them behind shadow shielding is one means of controlling occupational radiation exposure. The addition of a removable bottom steel shield plate 4 to 6 inches (7.6–10.2 cm) thick to the underside of the head 18 may also reduce occupational radiation exposure during transport to acceptable levels.

The major concern relative to the incore instrumentation system from a radiological perspective is the potential for over-exposure of personnel from the highly irradiated incore instrumentation system thimbles. Contact dose rates on the order of 10,000 R/hr are expected on the irradiated portion of the thimbles. Thus, it is mandatory that an unshielded line-of-sight to the irradiated material be avoided when the thimbles are in the withdrawn position. For example, the large diameter ventilation ducting at the top of the integrated head package in the current configuration of the AP600 severely compromises the integrity of the integrated head package shielding around the irradiated thimbles. These duct penetrations must be shielded prior to thimble withdrawal or an alternative ventilation design which does not afford a direct line-of sight through no shielding or minimal shielding must be incorporated.

Accordingly, it is an object of the invention to reduce the radiation exposure potential to personnel working near reactor head-mounted instrumentation.

It is another object of the invention to reduce radiation exposure resulting from irradiated head-mounted Incore Instrumentation thimbles.

These and other objects and advantages of the present invention will become more readily apparent as the following detailed description of the preferred embodiments proceeds.

SUMMARY OF THE INVENTION

According to the present invention, head-mounted incore instrumentation, including thimble sheath, mandrel, and (preferably) lead wires are fabricated of a low nuclear cross section material, drastically reducing the radiation field emitted by the instrumentation once it has been withdrawn from the highly irradiated reactor core.

In a preferred embodiment of the invention, the low nuclear cross section material is an alloy having as its major component zirconium or titanium, such as ZIRCALOY.

BRIEF DESCRIPTION OF THE DRAWINGS

A full understanding of the invention can be gained from the following description of the preferred embodiment when read in conjunction with the accompanying drawings in which:

FIGS. 4(A)-(C) depict alternative embodiments of a system for removing and storing incore instrumentation of the invention.

DETAILED DESCRIPTION OF THE PREFERRED EMBODIMENTS

Figure 1:
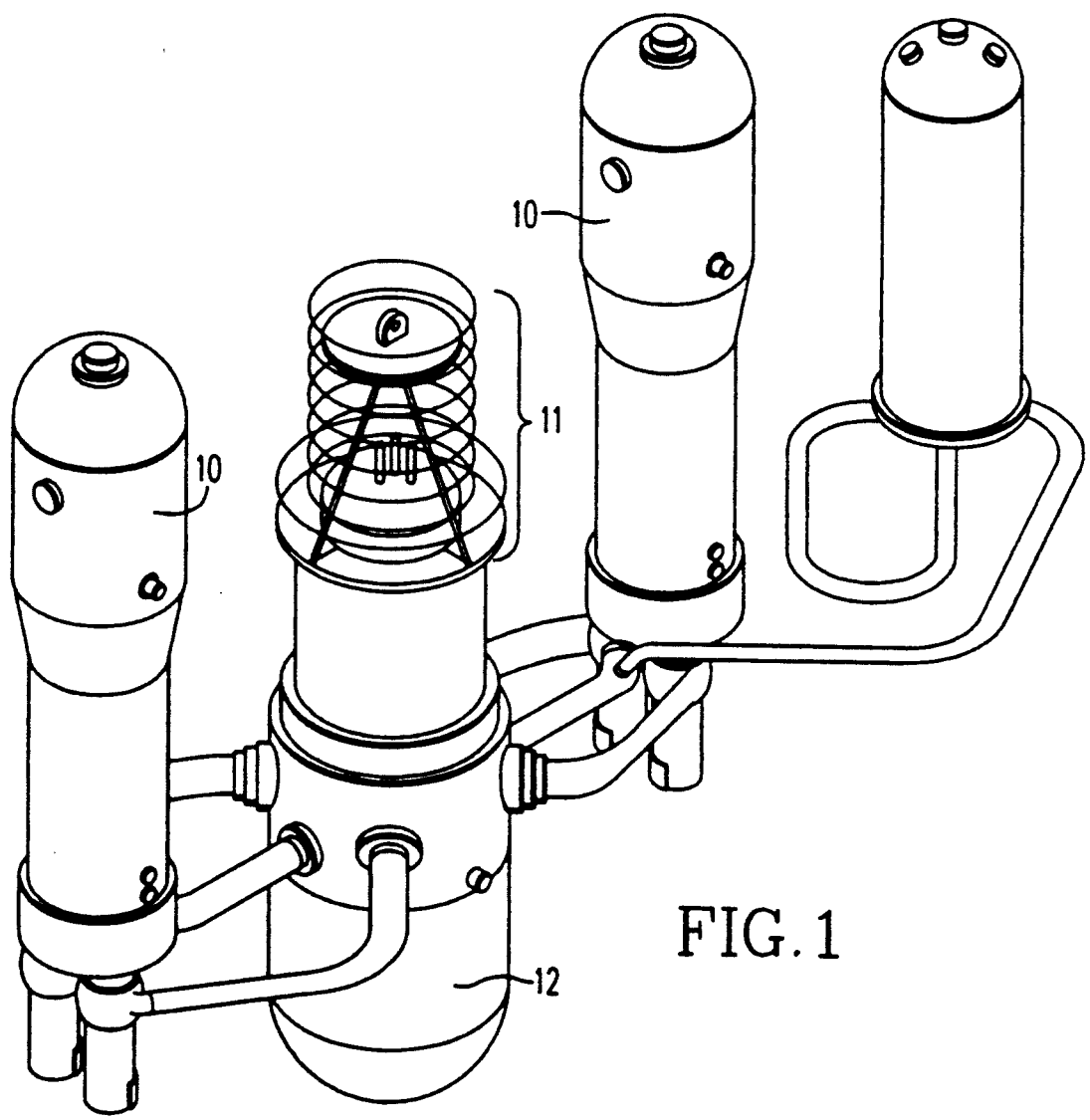
FIG. 1 is a schematic illustration of a nuclear reactor steam generation and cooling system.

FIG. 1 illustrates in schematic the reactor steam generation and cooling system of the AP600, comprising a reactor vessel 12 positioned between two steam generators 10. The reactor vessel 12 includes an integrated head package 11 that includes a thimble arrangement, not shown.

Figure 2:
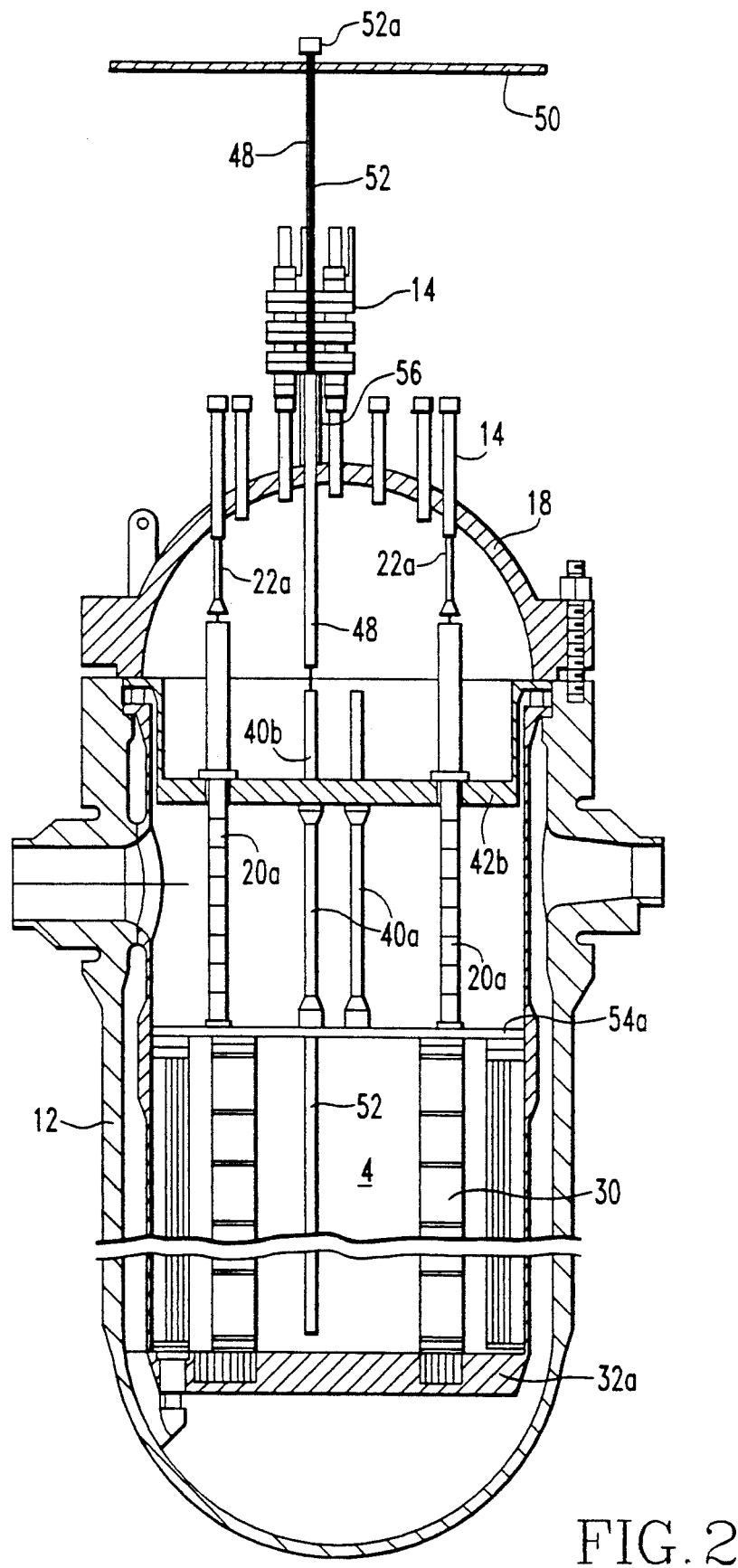
FIG. 2 is a cross sectional view of a PWR showing incore instrumentation of the invention.

Referring now to FIG. 2, a PWR incorporating a simplified incore instrumentation system in accordance with the present invention comprises the reactor vessel 12 covered by a removable closure head assembly 18. The reactor core 4 is composed of a plurality of fuel assemblies 30. The reactor core 4 rests on a lower core plate 32a fastened to the reactor vessel 12.

Above the core 4 is an upper core plate 54a, connected by vertical support columns 40a to an upper support plate 42b of substantial thickness (typically about 10 inches thick (25.4 cm)).

In addition to the upper core plate 54a and support columns 40a, the incore instrumentation system includes control rod guide tubes 20a for control rods and control rod drive shafts 22a which pass through the reactor vessel's closure head 18.

In a preferred embodiment, twenty-five or more detector thimbles 52 are inserted vertically into the reactor vessel 12 and core 4 through the head assembly 18, and through the upper internals support columns 40a. In addition, each thimble 52 contains six or more axially distributed fixed incore detectors and a thermocouple for measuring fuel assembly coolant exit temperatures (not shown). Primary boundary thimble seals 52a and detector wiring (also not shown) are located on the top of missile shield plate 50. This arrangement requires that pressure boundary guide tubes 48 (approximately 1.0"OD×0.5" ID (2.54 cm×1.27 cm)) be employed extending approximately 22 feet (6.71 m) from a head 18 penetration up through the missile shield 50. Adequate space is provided between the CRDM magnets 14 for the guide tubes (3.4 in diameter (8.6 cm)) to pass comfortably. The detector thimbles 52 are approximately 0.4 in. (1.0 cm) in diameter, about 51 ft. (15.5 m) long, and equipped with fittings or seals 52a to seal the guide tubes.

Figure 3:
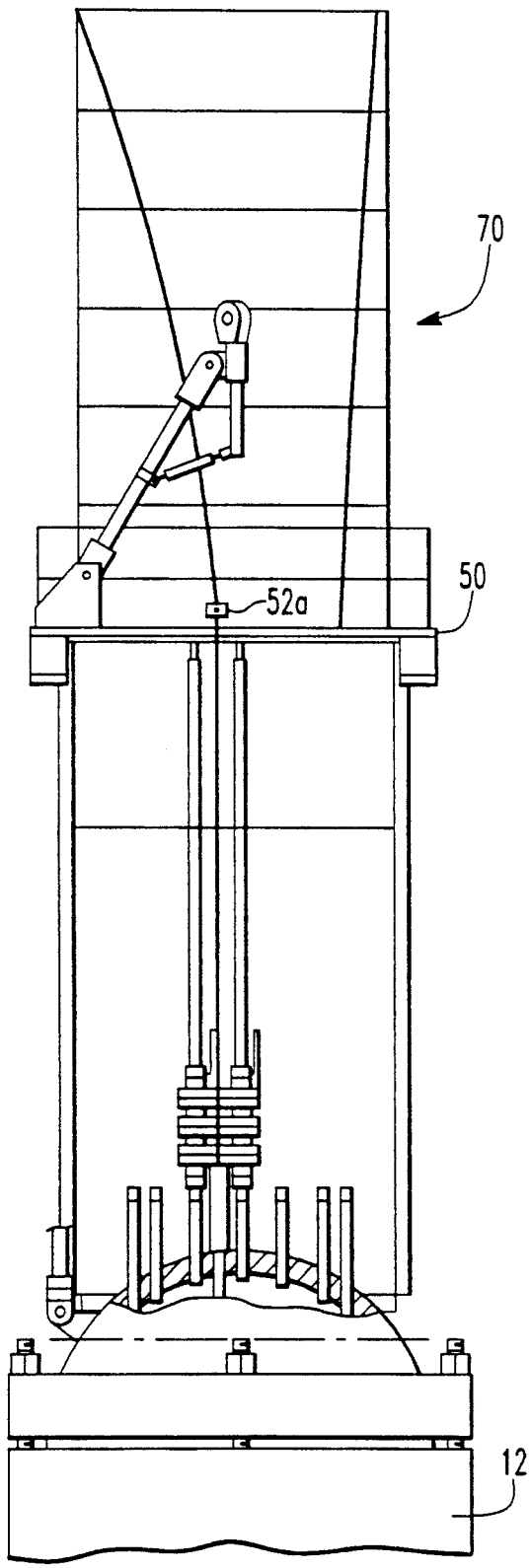
FIG. 3 is a side view of the PWR of FIG. 2 in conjunction with an apparatus for installing and removing incore instrumentation of the invention.
Figure 4C:
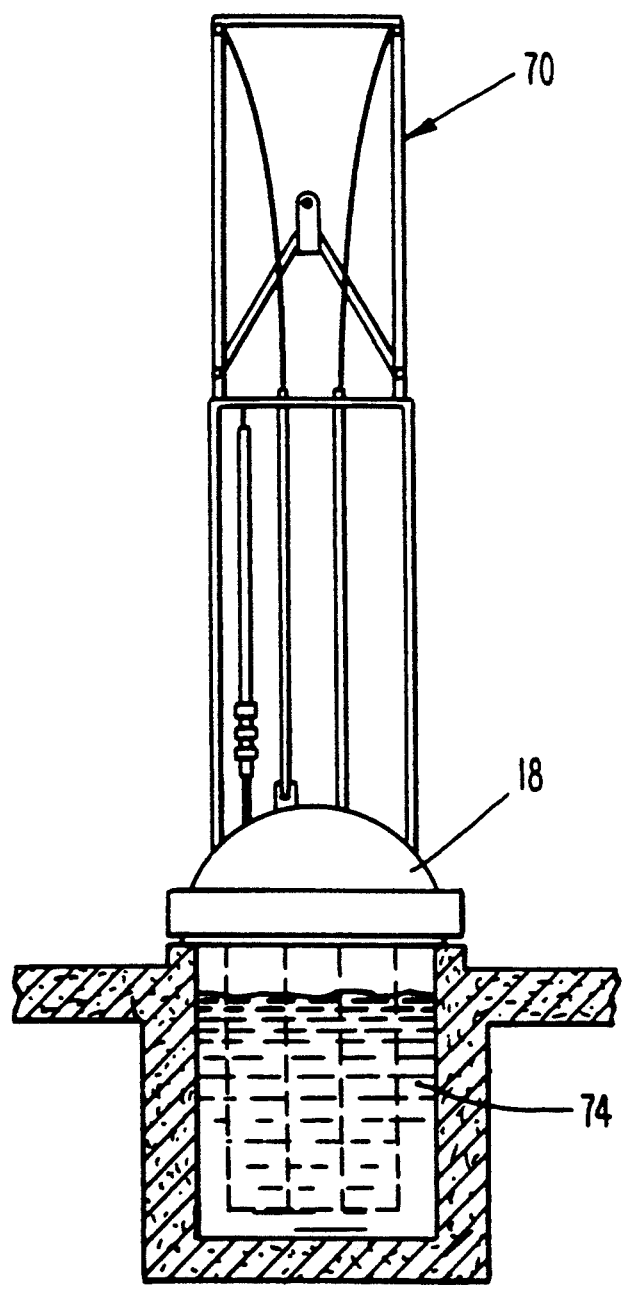

Referring now to FIG. 3, therein is shown a side view of an apparatus for installing and removing the incore instrumentation from the reactor vessel 12. Refueling operations require that the thimble/guide tube seals 52a be disconnected and that the thimbles 52 be retracted upwardly approximately 20 ft. (6.1 m). The upper nonradioactive portion of each thimble is secured in a raised position in a special rack 70 mounted above the IHP missile shield 50. The thimble storage rack 70 is designed with an internal tripod lifting rig so that a polar crane hook can be attached to the IHP without interfering with the raised thimbles 52. During IHP removal operations, the radioactive "hot" tips of the retracted thimbles 52 are stored under and within shielded positions of the IHP to minimize occupational radiation exposure. For removal and replacement of the thimbles 52, the "hot" portions are lowered into the refueling pool 74 where they can be cut off and transferred to the spent fuel pit (see FIGS. 4(A), 4(C)).

Figure 5:
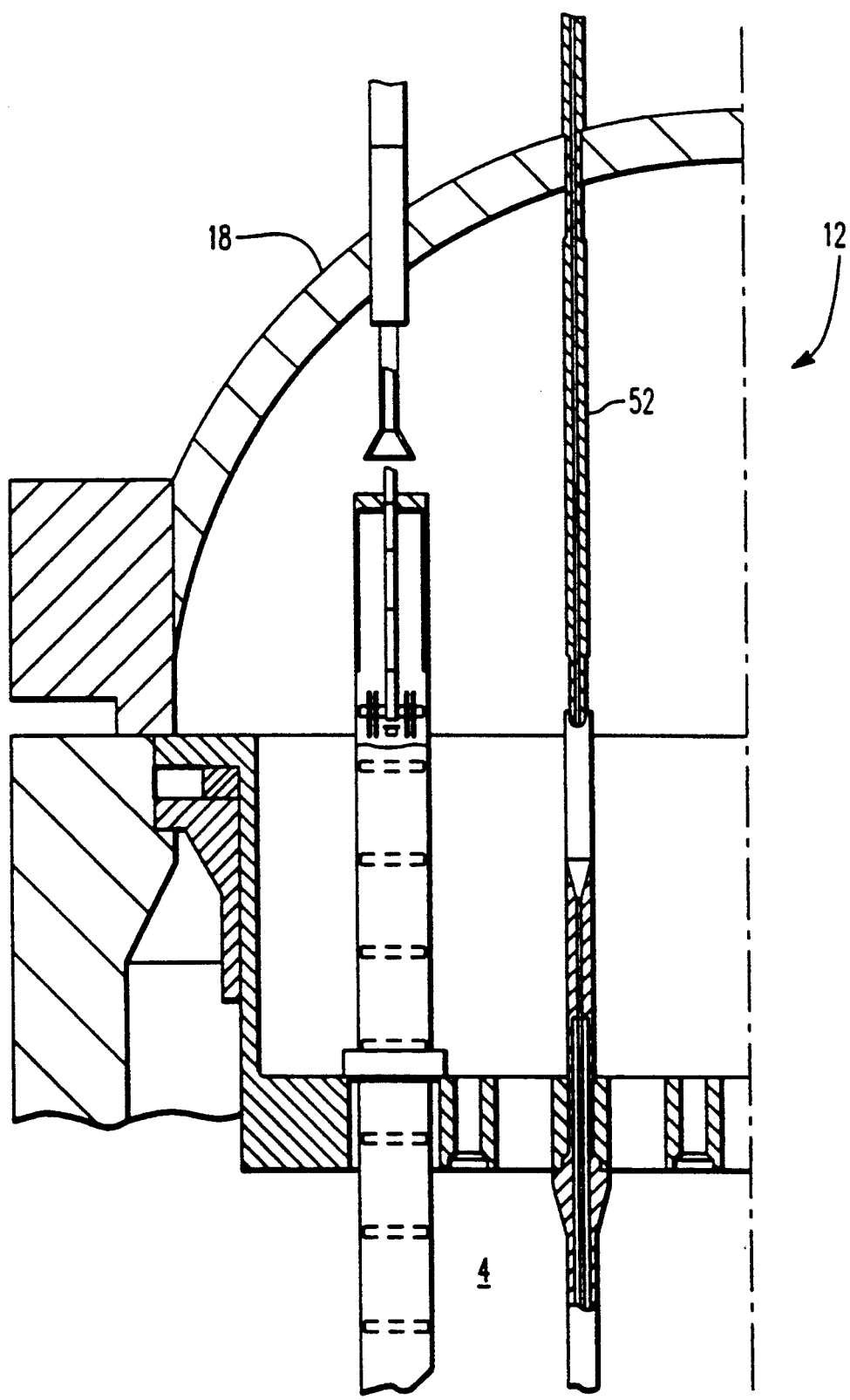
FIG. 5 is a cross sectional view of a portion of a reactor vessel head showing a thimble of the invention passing through the head cover into the reactor core.

FIG. 5 illustrates in cross section the top portion of the reactor vessel 12, further showing the thimble 52 passing through the head cover 18 and into the core 4 of the reactor 12.

Figure 7:
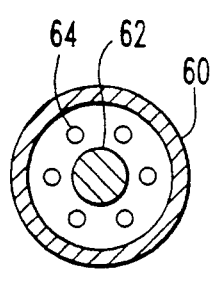
FIG. 7 is a cross sectional view of the thimble of FIG. 6 taken along the lines 7—7.
Figure 6:
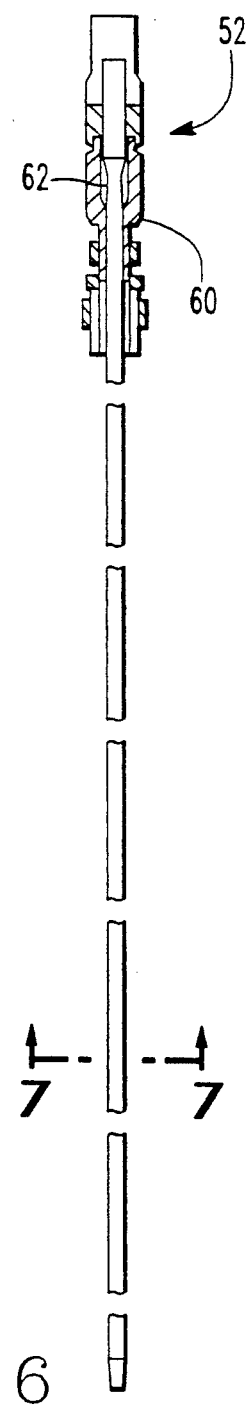
FIG. 6 is a partial cross sectional view of a thimble used in accordance with the present invention.

As best seen in FIGS. 6 and 7, the thimble 52 includes a thimble sheath 60 comprising a tubular member which is a structural pressure boundary, through which a center mandrel 62 passes. The mandrel 62 provides structural support to the cable 64. The cable 64 is fed from the top of the thimble, through the thimble sheath to the bottom of the reactor. Cable 64 is of a triaxial design, which a pair of lead wires are contained in a cable sheath, which provides structural wire support.

We have found that by replacing materials used in the head-mounted instrumentation that are not important in neutron detection (i.e., the major structural components which comprise most of the volume of the part) with low nuclear cross section material, radiation levels in the reactor head area attributable to the head-mounted instrumentation can be reduced by half or more.

Suitable low nuclear cross section materials include elements zirconium and titanium, and alloys thereof, such as ZIRCALOY and ZIRCALOY-4 (trademarks of Westinghouse Electric Corporation). These alloys typically comprise 95% or more zirconium or titanium.

According to the present invention, the thimble sheath 60 mandrel 62, and triaxial cable 64 of the thimble 52 may be fabricated of low nuclear cross section materials, as these components are not important for neutron detection.

EXPERIMENTAL

An analysis was carried out based on known radiation properties using theoretical thimbles having different materials of construction. A first thimble, (Source A) used a stainless steel 304 sheath and Inconel TM -600 lead wires. A second thimble (Source B) used stainless steel 304 both for the sheath and the lead wires, while a third thimble (Source D) used a Zircaloy-4 TM sheath and stainless steel 304 lead wires. In each case, the analysis of the thimbles were "irradiated" with an equal dose, equivalent to twenty years of reactor use. The thimbles were then "withdrawn" and theoretically measured for activity at a number of detector points. The results are shown in Table 1. Points B and E correspond to the top of the integrated head package and the reactor vessel flange, respectively, two points in which the majority of the personnel-intensive work is done.

TABLE 1

SCAP2 Results for Withdrawn Conditions (mrem/hr)

| Detector Point | Source A | Source B | Source D |
|---|---|---|---|
| B | 6.866E+00 | 6.314E+00 | 2.262E+00 |
| E | 2.639E+03 | 2.339E+03 | 1.124E+03 |

While specific embodiments of the invention have been described in detail, it will now be appreciated by those skilled in the art that various modifications and alternatives to those details could be developed in light of the overall teachings of the disclosure. Accordingly, the particular arrangements, objects, and advantages disclosed are meant to be illustrative only and not limiting as to the scope of the invention, which is to be given the full breadth of the appended claims and any and all equivalents thereof.

I claim:

1. A thimble for use in head-mounted instrumentation for nuclear reactors, said thimble retractably disposed in a removable head of a nuclear reactor vessel and comprising a sheath and a mandrel disposed within the sheath, the sheath and the mandrel both comprised of an alloy of a metal selected from the group consisting of zirconium and titanium, the sheath forming a pressure boundary in the reactor vessel.

2. The thimble of claim 1, characterized in that said metal comprises at least 95% of said alloy.

3. The thimble of claim 1, characterized in that said alloy is a ZIRCALOY alloy.

4. The thimble of claim 1, characterized in that the alloy is a ZIRCALOY-4 alloy.

5. A thimble arrangement for a nuclear reactor vessel, said thimble arrangement being mounted to the head of said reactor vessel and passing therethrough into the core of said reactor vessel, said thimble arrangement comprising a thimble sheath surrounding a thimble mandrel, said sheath and mandrel both being fabricated of an alloy of a metal selected from the group consisting of zirconium and titanium, the sheath forming a pressure boundary of the reactor vessel.

6. The thimble arrangement of claim 5, characterized in that said metal comprises at least 95% of said alloy.

7. The thimble arrangement of claim 5, characterized in that said alloy is a ZIRCALOY alloy.

8. The thimble arrangement of claim 5, characterized in that said alloy is a ZIRCALOY-4 alloy.

* * * * *